March 10, 1925.
W. S. SPENCE
AUTOMATIC SHUT-OFF VALVE
Filed Jan. 13, 1923
1,529,222
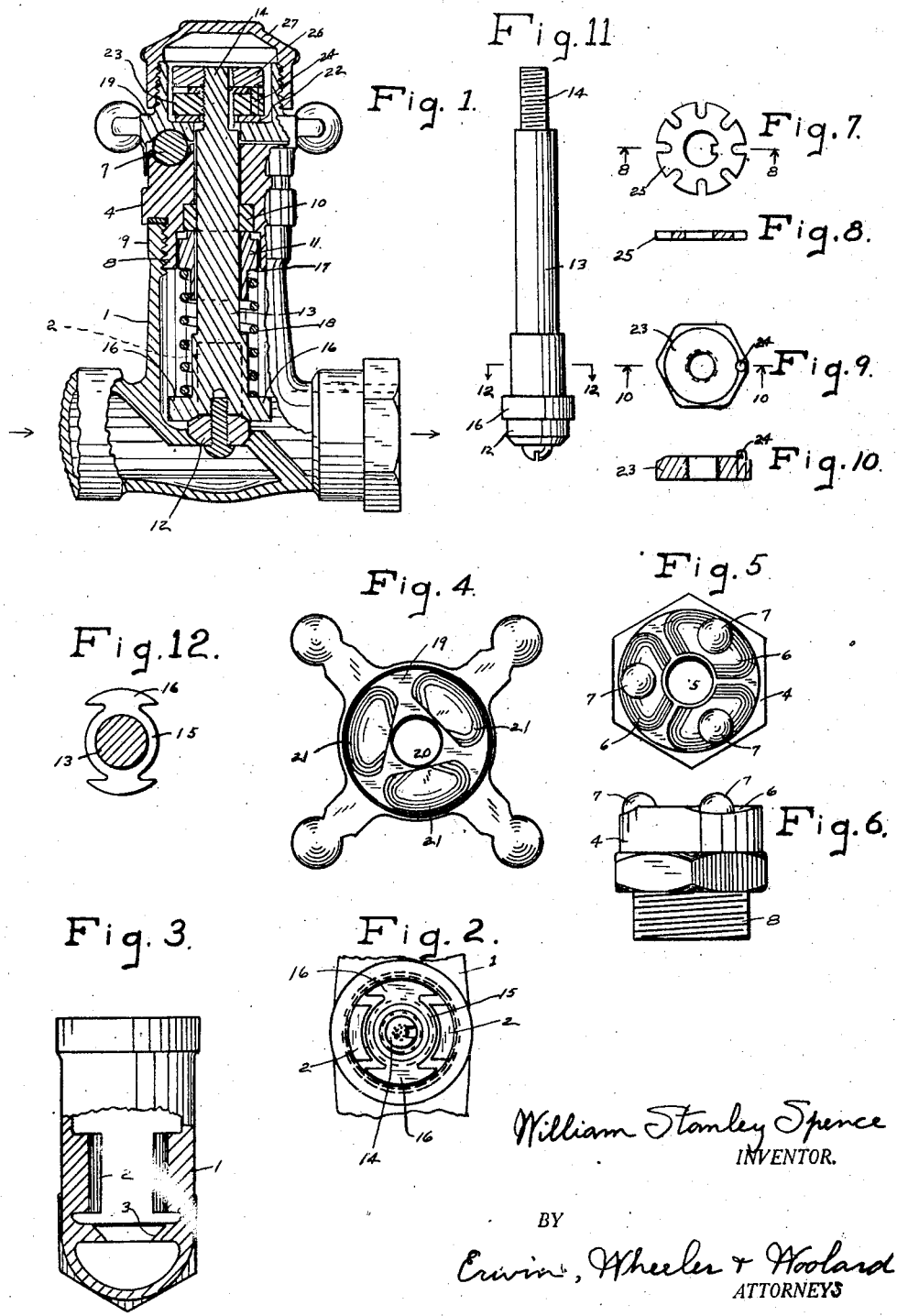
William Stanley Spence
INVENTOR.
BY
Erwin, Wheeler & Woolard
ATTORNEYS Patented Mar. 10, 1925.

1,529,222

UNITED STATES PATENT OFFICE.

WILLIAM STANLEY SPENCE, OF MILWAUKEE, WISCONSIN.

AUTOMATIC SHUT-OFF VALVE.

Application filed January 13, 1923. Serial No. 612,483.

*To all whom it may concern:*

Be it known that I, WILLIAM STANLEY SPENCE, a citizen of the United States, residing at Milwaukee, county of Milwaukee, and State of Wisconsin, have invented new and useful Improvements in Automatic Shut-Off Valves, of which the following is a specification.

This invention relates to improvements in automatic shut-off valves.

It is the primary object of this invention to provide an automatic shut-off valve having an axially movable valve stem and an operating handle, with improved means adapted to operatively engage the handle with the valve stem, said means being more cheaply manufactured and quickly assembled than has heretofore been possible.

Another object of this invention is to provide the casing of an automatic shut-off valve with improved means for limiting the rotative movement of the valve relative to the casing.

In the drawings:

Fig. 1 is a side elevation of an automatic shut-off valve partly in section.

Fig. 2 is a plan view of the valve casing and valve stem therein.

Fig. 3 is an end view of the casing partly in section.

Fig. 4 is a bottom plan view of the valve operating handle showing cam grooves.

Fig. 5 is a plan view of the casing cover showing cam grooves and balls therein.

Fig. 6 is a side elevation of the same.

Fig. 7 is a plan view of the serrated washer.

Fig. 8 is a section taken on line 8—8 of Fig. 7.

Fig. 9 is a plan view of the nut for engaging the operating handle of the valve stem.

Fig. 10 is a view taken on the line 10—10 of Fig. 9.

Fig. 11 is a side elevation of the valve stem.

Fig. 12 is a view of the stem taken on the line 12—12 of Fig. 11.

Like parts are identified by the same reference characters throughout the several views.

The valve casing 1 provided with inner lugs 2 and valve seat 3 has a cover 4 provided with a centrally disposed aperture 5. The cover has on its upper end cam grooves 6 adapted to receive balls 7. The lower end of the cover is provided with a threaded end 8 adapted to engage the threaded end 9 of the casing 1. The end 8 on the cover has concentric with the aperture 5 two annular depressions adapted to receive the packing 10 and the sleeve 11.

Within the casing is a valve 12 adapted to be operated by valve stem 13 which extends upwardly through the sleeve 11, packing 10 and cover 4 and is provided with a threaded end 14. The lower end of the valve stem is provided with an annular collar 15 having lugs 16 adapted to engage lugs 2 of the casing. The lugs 2 are adapted to cooperate with lugs 16 to limit the rotative movement of the valve relative to the casing. Disposed between the collar 15 and collar 17 of the sleeve 11 is a spring 18 adapted to maintain a valve 12 in closed position and the sleeve against the packing 10 to seal the aperture 5 against the leakage of water.

A valve operating handle 19 having an aperture 20 is provided with cam grooves 21 similar to cam grooves 6. When the handle 19 is placed in position (see Fig. 1), the balls 7 extend into the cam grooves 6 and 21 and the stem 13 extends through the aperture 20. The handle 19 operatively engages the stem 13 by means of the washer 22 which is held in contact with the handle by a nut 23 engaging the threaded end 14 of the stem. The nut 23 is held against rotation by the pin 24 which is engaged by the serrated washer 25 keyed to the stem 13. The nut 23, as will be readily seen, may be adjusted in a plurality of positions by engaging the pin 24 with any one of the serrations on washer 25. The washer 25 is retained in position by nut 26. Cap 27 is provided having threaded engagement with the handle 19.

When it is desired to open the valve 12, the handle 19 is rotated and caused to rise vertically relative to the casing by the balls 7 which engage the cams 6 and 21. The vertical movement of the handle 19 by its engagement with the washer 22 causes the stem to rise vertically and thereby open the valve 12. It will be obvious, therefore, that when the lever 19 is released, the valve will automatically be closed by the spring 18.

It is to be understood that the valve mechanism herein disclosed is not limited in use to the particular valve casing shown but may be used upon any valve casing having an inlet and outlet and a valve seat disposed between them.

It will, therefore, be seen that I have provided an automatic shut-off valve having an axially movable valve stem and an operating handle, with improved means for operatively engaging the handle with the stem, said means being such that they may be more cheaply manufactured and quickly assembled than has heretofore been possible.

Furthermore I have provided the valve casing with improved means for limiting the rotative movement of the valve relative to the casing.

I claim:

1. In an automatic shut-off valve the combination with a valve casing having a valve seat, of a valve provided with a valve stem, of means including a handle for operating said valve, a nut for said stem provided with a pin, a serrated washer keyed to said stem adapted to engage said pin, and a nut adapted to hold said washer in position.

2. In an automatic shut-off valve the combination with a valve casing having a valve seat, of a valve provided with an axially movable valve stem having an end provided with a single thread, a handle for operating said valve stem, a washer adapted to engage said handle, a nut adjustably engaging said end and adapted to maintain said washer in contact with said handle, a pin on said nut, a washer provided with a serrated periphery adapted to engage the pin and adapted to be held against rotation by said valve stem, and a second nut engaging said end and adapted to maintain said serrated washer in contact with said first mentioned nut.

3. In an automatic shut-off valve, the combination with a valve casing having an inlet and outlet and provided with a valve seat and lugs adjacent the outlet side of said valve seat, of a valve, a stem for the valve provided with a collar having lugs, a sleeve for said stem having a collar, a spring disposed between the collars on said stem and sleeve, means including a handle for operating said valve stem, a washer adapted to contact with said handle, a nut for said stem having a pin and adapted to maintain said washer in position, a serrated washer keyed to said stem and adapted to engage said pin, whereby said nut will be held against rotation.

WILLIAM STANLEY SPENCE.